(12) United States Patent
Dickinson

(10) Patent No.: US 7,539,490 B2
(45) Date of Patent: May 26, 2009

(54) METHOD AND SYSTEM FOR RAPID CHANNEL ACQUISITION ACROSS HETEROGENEOUS RADIO ACCESS TECHNOLOGIES

(75) Inventor: Timothy A. Dickinson, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 429 days.

(21) Appl. No.: 11/319,867

(22) Filed: Dec. 27, 2005

(65) Prior Publication Data

US 2007/0149172 A1 Jun. 28, 2007

(51) Int. Cl.
*H04W 4/00* (2006.01)
(52) U.S. Cl. .............. 455/432.1; 455/432.3; 455/434; 455/436; 455/437; 455/438; 455/439; 455/440; 455/441; 455/442; 455/443; 455/444
(58) Field of Classification Search ............ 455/436, 455/444, 442, 432.1, 432.3, 434
See application file for complete search history.

(56) References Cited

U.S. PATENT DOCUMENTS

| 5,561,836 | A  | * | 10/1996 | Sowles et al. | ............... | 455/428 |
| 5,926,761 | A  | * | 7/1999  | Reed et al. | ................... | 455/440 |
| 7,469,142 | B2 | * | 12/2008 | Nelakanti et al. | ........... | 455/436 |
| 2004/0087307 | A1 | * | 5/2004 | Ibe et al. | ..................... | 455/436 |
| 2005/0025182 | A1 | * | 2/2005 | Nazari | ........................ | 370/469 |
| 2005/0048972 | A1 |   | 3/2005 | Dorenbosch | | |
| 2006/0111112 | A1 | * | 5/2006 | Maveddat | .................... | 455/439 |
| 2006/0291455 | A1 | * | 12/2006 | Katz et al. | .................. | 370/355 |

* cited by examiner

*Primary Examiner*—Nick Corsaro
*Assistant Examiner*—Vladimir Magloire
(74) *Attorney, Agent, or Firm*—Philip H. Burrus; Sylvia Chen

(57) ABSTRACT

A system and method for accommodating a rapid transition between heterogeneous radio access technologies is provided. A local network 105 having a controller 114 and a plurality of access points 106,107,108,109,110,111 receives information 117 from a communication device 101 relating to the network 116 it is exiting. During the transition process from a first network 116, for example a cellular wide area network, to a second network 105, for example an IMS-WLAN, the communication device 101 passes its wide area network servicing base station information 117 to an access point 106 of the local network 105. Upon exiting the local network 105, wide area network servicing base station information 121 is delivered to an exiting communication device 112, thereby enabling it to abbreviate or eliminate traditional scanning and acquisition processes that occur in network handoff exchanges.

22 Claims, 5 Drawing Sheets

US 7,539,490 B2

METHOD AND SYSTEM FOR RAPID CHANNEL ACQUISITION ACROSS HETEROGENEOUS RADIO ACCESS TECHNOLOGIES

BACKGROUND

1. Technical Field

This invention relates generally to a system and method of transferring a wireless communication device from a first network to a second network, and more specifically to a system and method for rapidly and seamlessly transitioning a communication connection between a wireless wide area network and a wireless local area network having a different radio access technology.

2. Background Art

In recent years, mobile telephones have enjoyed explosive growth in popularity. Once a luxury for only a few, today millions of people use mobile telephones to stay connected with friends, family, and coworkers. Coupled with the rise in popularity of mobile telephones has been an improvement in wireless communications networks. Older, analog systems have given way to new digital technologies and high capacity communication networks. Communication systems like Code Duplex Multiple Access (CDMA) and Global Systems for Mobile Devices (GSM) offer mobile telephone users reliable voice connections around the world.

In addition to voice communication, many mobile phones today are capable of exchanging packet data. For instance, phones capable of working in General Packet Radio Service (GPRS) systems are capable of exchanging packets of data between the mobile phone and a wireless network. While many wireless wide area networks offer switched packet data service, the data transfer rates can be slow. Additionally, some service providers charge additional fees for switched packet data service, because it consumes network resources that might otherwise be used for voice calls.

Technological advances in wireless Local Area Network (LAN) technology offer an alternative to wireless wide area networks. The cost of Wireless LAN (WLAN) equipment has become so affordable that many businesses, including hotels, coffee shops and airports, offer "hot spots" within which a wireless device may connect with a WLAN, such as a private Intranet or a public network like the Internet or World Wide Web. These WLANs often offer significantly higher data transfer rates and are generally provided by businesses at no charge to the end user to entice patronage. The presence of these WLANs gives users alternative paths with which to transfer data, and even voice (where using Voice Over IP (VOIP) technology, for example). Indeed, some mobile devices provide for switching between wireless wide area networks and WLANs to take advantage of the higher data speeds and lower costs when a WLAN is present.

The problem with such devices is that they must execute a complicated and time-consuming handoff procedure when transitioning from one wireless network to the next. For example, when a user moves from an IP Multimedia Subsystem (IMS) LAN network to a GSM wide area network, the device must scan the area to detect the wide area network and then determine (generally by downloading large amounts of data) what kind of network it is, what protocol it uses, how to connect to it, what channels to use, when to connect and, so forth. Each of these steps consumes both time and device processing power. Consequently, when the process takes too long, voice and data connections may be delayed or interrupted.

There is thus a need for an improved system and method for rapidly and efficiently facilitating the handoff of a wireless device from a wireless network of one type to a wireless network of another type.

BRIEF DESCRIPTION OF THE DRAWINGS

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
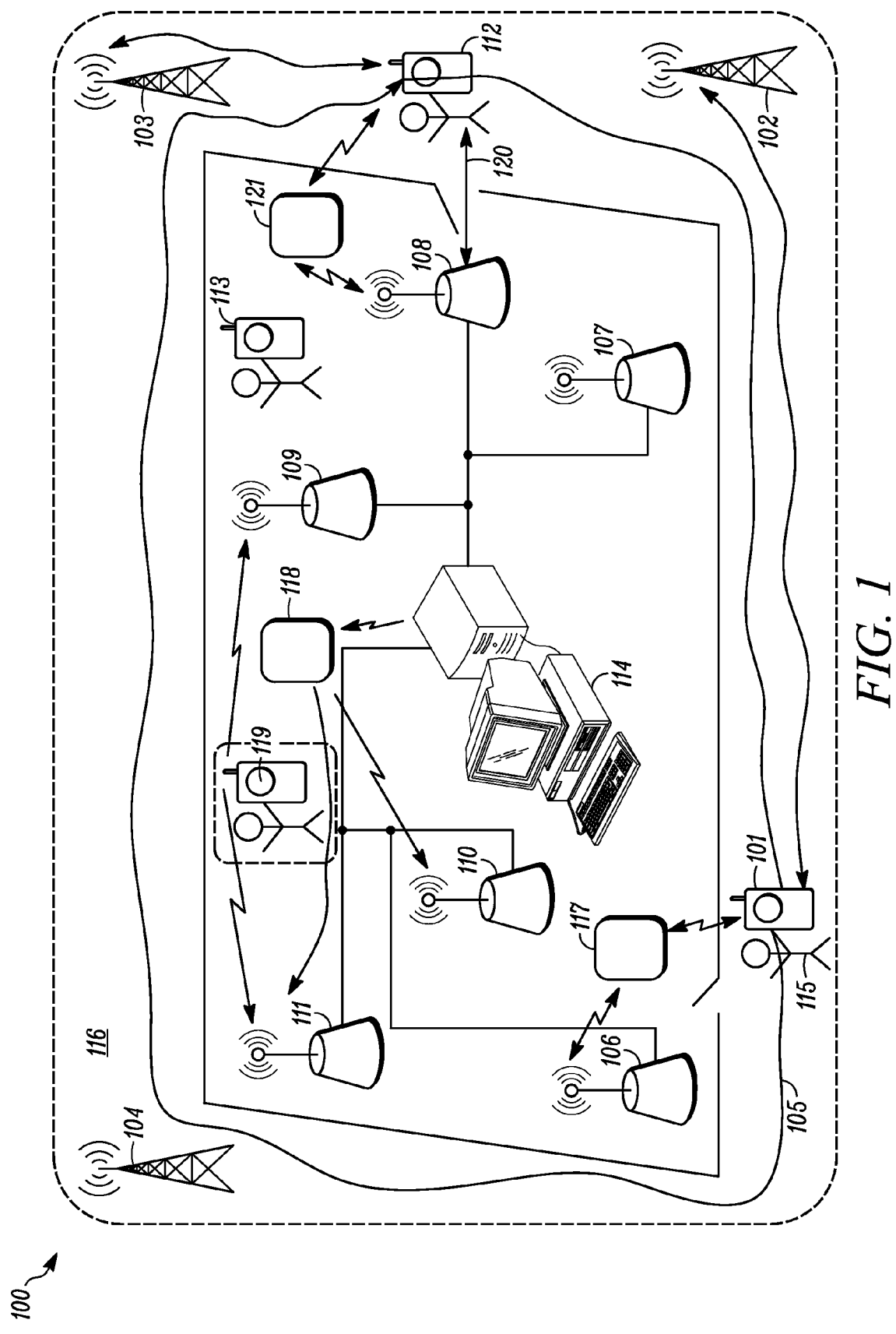
FIG. 1 illustrates a wireless transceiver network capable of accommodating transfers of a communication device with a wide area network in accordance with various embodiments.

Various embodiments will now be described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like are used solely to distinguish one entity or action from another entity or action without necessarily requiring or implying any actual such relationship or order between such entities or actions.

The apparatus components and method steps shown herein have been represented where appropriate by conventional symbols in the drawings, showing only those specific details that are pertinent to understanding the embodiments of the present invention so as not to obscure the disclosure with details that will be readily apparent to those of ordinary skill in the art having the benefit of this specification.

As illustrated and described herein, a multimode communication device, such as a mobile telephone, is capable of seamlessly transitioning between a plurality of heterogeneous wireless networks. The communication device can switch from one radio access technology to the next in less time, and using less processing power, than with prior art systems. This is the case even where the different radio access technology networks are owned or operated by different entities.

The communication device is able to rapidly acquire and register itself on a wide area wireless network when exiting an alternate radio access technology, such as a WLAN. The rapid channel acquisition and registration helps to ensure a seamless transition for voice, data and multimedia services, thereby reducing the probability for data transfer interruptions.

In one embodiment, when the communication device moves from a wide area network (such as a conventional cellular network) to an IMS-WLAN, the device delivers wide area network servicing base station information to an access point within the IMS-WLAN. A controller within the IMS- WLAN then links the delivered information with a specific access point to which the communication device delivered the information. When a communication device, be it the one that delivered the information or another, exits the IMS-WLAN, wide area network servicing base station information is passed to the exiting communication device, thereby enabling the device to bypass the traditional wide area network scanning process.

Turning now to FIG. 1, illustrated therein is one embodiment of a wireless transceiver network 100 capable of accommodating transfers of a communication device 101 between a wide area network 116 (having towers 102,103,104) and the wireless transceiver network 105. In one embodiment, the communication device 101 comprises a radiotelephone. The communication device 101 may alternatively be a laptop or other personal or portable computer, a personal digital assistant with wireless communication capabilities, or similarly equipped electronic devices having the ability to send, receive, or both, wireless communication information. The wireless transceiver network 105 includes a plurality of access points 106,107,108,109,110,111 that are configured to communicate wirelessly with the communication device 161. These access points 106,107,108,109,110,111 serve as "mini-towers" for the wireless transceiver network 105 as they provide the wireless, radio frequency communication to and from wireless devices (e.g. 113,119) disposed within the network 105.

A controller 114 is coupled to the access points 106,107, 108,109,110,111. As used in this document, "coupled" may refer to either a direct or indirect connection. The controller 114 serves as a central data and communication hub for information flowing across the network 105. The controller 114, which may be a networked computer, server or other central control device, includes various modules operable with the access points. The modules, which may either be configured in hardware or software, assist the controller in both managing information and facilitating fast, seamless transfers of communication devices between the network 105 and other radio access technology networks (e.g. 116).

Figure 2:
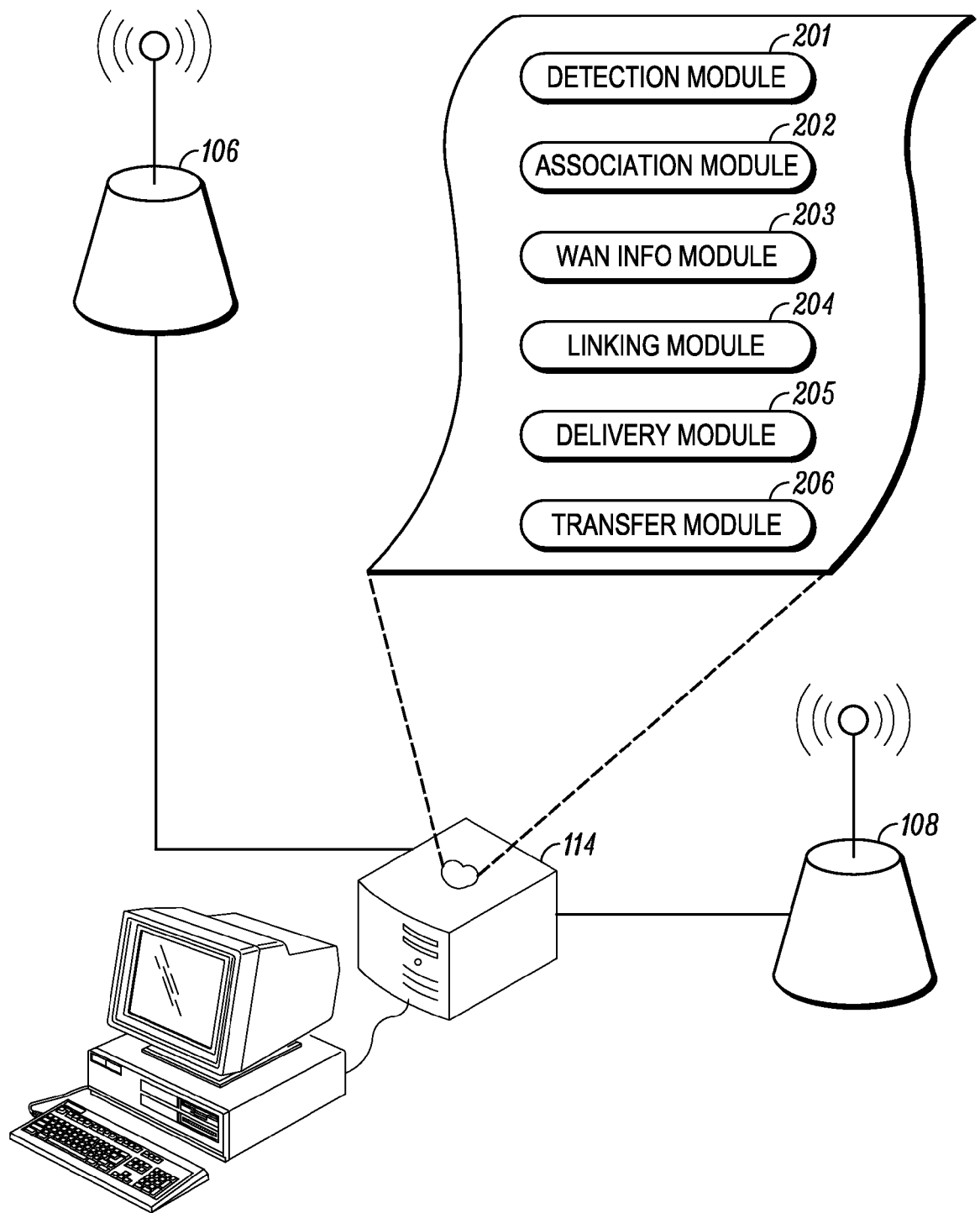
FIG. 2 illustrates a controller and associated modules in accordance with various embodiments.

Turning briefly to FIG. 2, illustrated is one embodiment of a controller 114, with associated modules 201,202,203,204, 205,206—shown in FIG. 2 as being configured in software. For instance, there is a detection module 201 configured to detect the presence of a communication device when the device is within a predetermined proximity of any of the access points (e.g. 106). The detection module 201 may, for example, notify either the controller 114 or a specific access point that a communication device is within an acceptable range such that communication with the wireless transceiver network may begin.

Additionally, an association module 202 is configured to authenticate and associate the communication device with the network 105 once the detection module 201 has determined that the device is present within the network 105. The association module 202 may determine what type of hardware the communication device is, as well as optimal channels, protocols and other methods for communication with the communication device. The association module 202 may further register the communication device with the network 105 so that the device may be properly supported while within the network 105.

A wide area network information module 203 is configured to receive wide area network servicing base station information from the communication device once it has been authenticated and associated with the wireless transceiver network 105. The wide area network information module 203 collects the wide area network servicing base station information and then provides it to exiting communication devices when appropriate. In other words, it is the wide area network information module 203 that receives, for example, information from the communication device regarding which wide area network it was in communication with prior to entering the wireless transceiver network 105, what channels or frequencies it was communicating with, and other information necessary for a communication device to establish communication with a particular wide area network upon exiting, for example, the wireless transceiver network 105.

The controller 114 also includes a linking module 204 that is configured to associate the wide area network servicing base station information with a specific access point, e.g. access point 106. In one embodiment, the specific access point 106 is the access point from which the wide area network servicing base station information was received. In such an embodiment, the access point 106 would receive the wide area network servicing base station information when the communication device entered the wireless transceiver network 105, and then would deliver it back to the communication device if the device left the wireless transceiver network through the same portal of entry. Such a scenario may occur when a user of the device enters and leaves through the same door of a building, for example.

In another embodiment, the specific access point 106 and the access point delivering the wide area network servicing base station information to the communication device, e.g. access point 108, are different. In such an embodiment, the specific access point 106 receives the wide area network servicing base station information regarding tower 102, and the controller 114 causes some or all of it to be delivered to other access points as required by exiting devices, e.g., access point 108. Such a scenario may occur when a communication device operating on wide area network A, provided by carrier A, enters through one door of a building, and either the same communication device or another communication device leaves through a different door. The access point closest to the exiting door, access point 108 in this example, will wirelessly deliver information to the exiting communication device. To accomplish this, the controller 114 retrieves the wide area network servicing base station information received from the specific access point 106, and optionally other access points 107,108, by way of the linking module 204. The controller 114 may then extract or filter some or all of the information so as to deliver on the appropriate wide area network data required by the exiting device through access point 108.

In one embodiment, the controller 114 is capable of learning which access points may be in contact with overlapping wide area networks as it receives more wide area network servicing base station information from various devices. Once the linking module 204 associates this information with a specific access point, the controller 114, which may be stand alone or embedded in any of the access points, is able to store and map the information as a shared resource. As such, an exiting device may receive information from an access point that is different from the access point of entry.

A delivery module 205 facilitates the delivery of the wide area servicing base station information from an access point to the communication device. When any communication device exits the WLAN by exceeding a predetermined proximity from any of the plurality of access points, be it the specific access point 106 or another access point, the delivery module 205 delivers the wide area network servicing base station information to that communication device. Again, the specific access point 106, i.e. the access point from which the information was received, and the access point delivering the information may be the same access point or different access points. The controller 114 may distribute the wide area network servicing base station information received from the communication device to any of the plurality of access points as requested by an exiting device. The delivery module 205 then delivers the information to the communication device.

A transfer module 206 is configured to disassociate and deactivate the exiting communication device from the wireless transceiver network 105 upon delivery of the wide area network servicing information to the communication device. For the communication device to begin communicating with the wide area network, for example during a single call session, a hand-off between the wireless transceiver network 105 and the wide area network must occur. The transfer module 206 facilitates this transfer by alerting the controller 114 that the exiting communication device will no longer be active on the wireless transceiver network 105.

In the preceding paragraphs there has been a discussion of the handling of the wide area network servicing base station information. Note that this information, received from the communication device upon entering the wireless transceiver network 105 and delivered to the communication device upon exiting the wireless transceiver network 105, contains information needed by the communication device to successfully communicate with the wide area network 116. Such information includes, but is not limited to, service provider identification, base station identification, base station identity code, broadcast control channel, neighbor lists, base station location, channel frequency, absolute radio frequency channel number, channel timeslot information, channel band information, primary and secondary synchronization codes, and channel identification information. The communication device uses this information to communicate with a base station (e.g. station 104 in FIG. 1) of the wide area network 116 which, in one embodiment, may be any of a GSM. network, CDMA network, TDMA network, iDEN network, WiMAX network, and UMTS network. Such information may be used when the communication device is communicating either exclusively with the wide area network 116 or with both the wide area network 116 and the wireless transceiver network 105.

The wide area network servicing base station information may be transmitted to and from the communication device and access points in a variety of ways. In one embodiment, this information is transmitted by way of a Session Initiation Protocol (SIP) message, as is set forth in the Third Generation for Wireless Networks (3GPP) and other standard specifications. In such a SIP message, body and other fields are populated with the wide area network servicing base station information so as to be easily transmitted between networks and devices. The details of SIP commands and their usage are recited in the 3rd Generation Partnership Project (3GPP) Technical Specification Group Services and System Aspects MultiParty (MPTY) Supplementary Services technical specification 3GPP TS 22.084, 3GPP RFC 3892 and 3GPP2 X.S0013, which are incorporated herein by reference.

Figure 3:
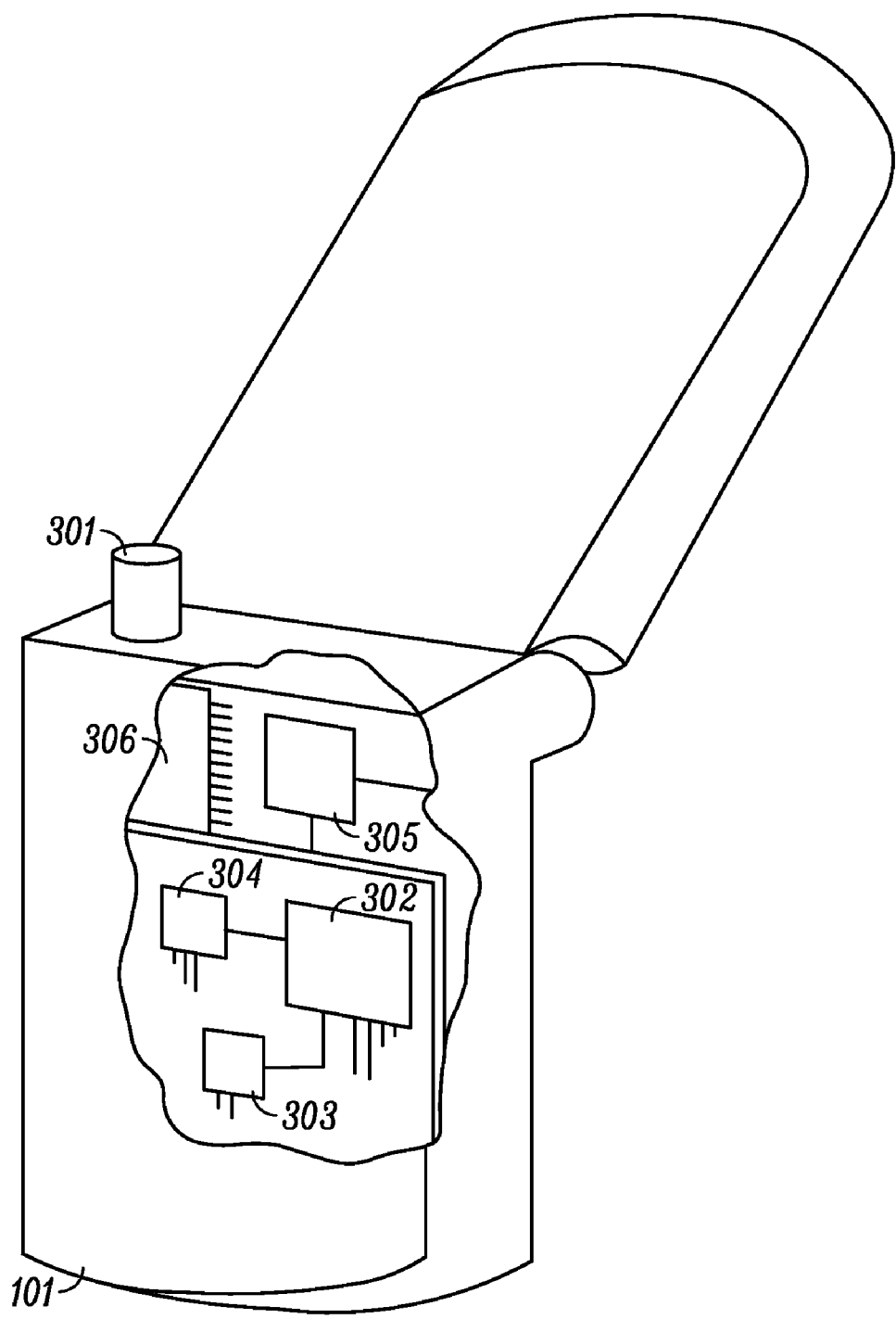
FIG. 3 illustrates a communication device capable of communicating with a plurality of communication networks in accordance with various embodiments.

Turning now to FIG. 3, illustrated therein is one embodiment of a communication device 101 suitable for use with a wireless transceiver network in accordance with various embodiments. While the exemplary device 101 illustrated in FIG. 3 is a mobile telephone, it will be clear to those of ordinary skill in the art having the benefit of this disclosure that the invention is not so limited. Other wireless communication devices may also be used, including personal digital assistants, portable computers, pagers, and other wireless information devices.

The communication device 101 is capable of communicating with a plurality of wireless communication networks, including those with differing or heterogeneous radio access technologies. For example, the device 101 may be a capable of communicating both with a wide area cellular network and a WLAN. To do so, the device 101 includes a transceiver and associated circuitry 306 and an antenna (collectively referred to as the "transceiver" and referenced by designator 301) capable of exchanging switched packet data with a first wireless communication network and a second wireless communication network. The transceiver 301 may be radio frequency (RF) hardware and software capable of communicating with a remote base station per a protocol associated with that base station. Example protocols include GSM, CDMA, TDMA, iDEN, WiMAX, and UMTS.

The device 101 includes a central processor 302 electrically coupled to the transceiver 301. The central processor serves as the control unit for the device 101, executing an instructional code configured in embedded firmware. The central processor 302 includes (or is coupled with) storage memory 303 for storing instructional code sets, user data and the like.

The device 101 also includes a power regulation module 304 that is operative. with and responsive to the central processor 302. When, for example, the device 101 is communicating only with a WLAN, the access points associated with the WLAN are within close proximity to the device 101. (The access points are close in a local area network when compared to, for example, towers in a wide area cellular network.) As such, the transceiver 301 is communicating with an access point that may be only a few hundred feet away, rather than a few miles away as might be the case in the wide area network. The central processor 302 can therefore cause the power regulation module 304 to actuate a reduced power consumption mode within the device 101 without compromising reliability or performance because less power is required for signal transmission. This reduced power consumption mode extends the battery life of the device 101.

Working in conjunction with the central processor 302, the device 101 includes an access point proximity detector 305. The access point proximity detector 305 is capable of determining whether the device 101 exceeds a predetermined range from an access point in a wireless communication network. This proximity determination may be accomplished in a variety of ways. For example, the access point proximity detector 305 may determine that the wireless communication device exceeds a predetermined range from the access point by measuring a quality of signal received by the transceiver 301. In the alternative, the access point proximity detector may determine that the predetermined range has been exceeded by measuring a strength of signal received by the transceiver 301.

Turning now back to FIG. 1, having described both the modules 201,202,203,204,205,206 of the controller 114 and the components of the communication device 101, the operation of the system will be described in more detail. When a user 115 with a wireless communication device 101 moves from a first wireless communication network 116 to a second wireless communication network 105, a handoff of the device 101 may occur between the networks 116,105. At one point during the handoff, the device 101 is communicating with both the first communication network 116 and the second communication network 105. At the time where the device 101 is communicating with both the first wireless communication network 116 through tower 102 and the second wireless communication network 105 through access point 106, the device 101 transmits wide area network servicing base station information 117 associated with tower 102 of the first wireless communication network 116 to the wireless second communication network 105. Specifically, the device 101 transmits the information 117 to an access point (e.g., access point 106) within and coupled to the second communication network 105.

A controller 114 coupled to the access point 106 may associate the wide area network servicing base station information 117 associated with tower 102 of the first wireless communication network 116 with an address of the access point 106 in the second wireless communication network 105 from which the information 117 was received.

Said differently, the controller 114 determines, for example, that a "model A" handset just came within a predetermined proximity of access point B, and delivered information that the handset had been talking with network C provided by carrier D using technology E and with available services F and G. The linking module 204 then associates this information to the address of the receiving access point, as another communication device exiting from this access point has a probable need to be delivered this same information. The controller 114 then distributes this information to the other access points 107, 108, 109, 110, 111 in the second communication network 105 as required by an exiting device. This distribution is illustrated by copy information 118 being delivered to access points 110 and 111.

As noted above, when a communication device 101 is communicating only with the second wireless communication network 105, as is communication device 119 in FIG. 1, the central processor 302 within the device 119 causes the power regulation module 304 to actuate a reduced power consumption mode within the wireless communication device 119. Again, one beneficial effect of the reduced power consumption mode is that the battery disposed in the device 119 will be able to deliver extended talk time.

Now, to expedite the hand off from the second communication network 105 back to the first communication network 116 when a communication device leaves the second communication network, wide area network servicing base station information must be delivered to the device. To effect this delivery, when the access point proximity detector in an exiting communication device, e.g. device 112, determines that the device 112 exceeds a predetermined range 120 from a closest access point 108 in the second communication network 105, the central processor 302 of the device 112 causes the transceiver 301 to transmit a request to the access point 108 for wide area network servicing base station information associated with the first wireless communication network 116. The controller 114 then causes the access point 108 to deliver wide area network servicing base station information 121 to the device 112 so that the device 112 may acquire and access the first communication network 116 without the need of going through the traditional scanning and acquisition process.

As noted above, in the preceding discussion the access point receiving the wide area network servicing base station information, i.e. access point 106 in FIG. 1, was referred to as the specific access point. While the access point delivering the wide area network servicing base station information may be the specific access point 116, it need not be. As shown in FIG. 1, thanks to the action of the delivery module 205 in the controller 114, the delivering access point, access point 108, need not be the specific access point 116. They can be the same or can be different. As the system acquires more and more wide area network servicing base station information, and as it continues to associate the received information with addresses of specific access points, the system can optimize delivery. For example, if devices entering at access point 106 always transitioned from tower 102, which may correspond to network A, and devices entering at access point 108 tended to transition from tower 103, which may correspond to network B, the controller may first attempt to deliver tower 102 information from access point 106 and tower 103 information from access point 108 to further expedite the handoff process.

Figure 4:
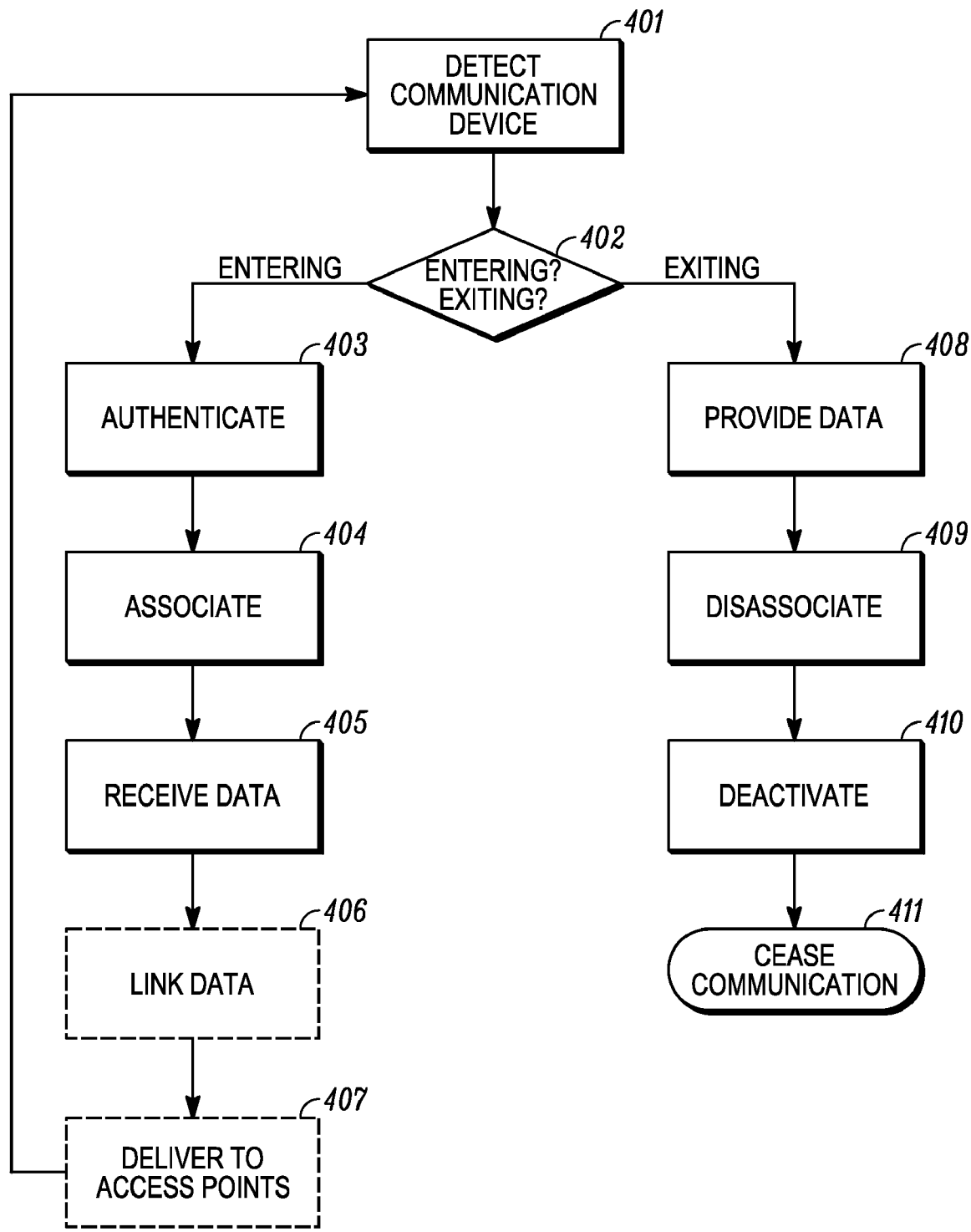
FIGS. 4-6 illustrate a method of transferring a communication device between a wide area network and a local area network in accordance with various embodiments.

Turning now to FIG. 4, illustrated therein is a method of transferring a wireless communication device between a local wireless base transceiver network to a wide area network in accordance with one embodiment. At step 401, the local network detects the presence of a communication device. This may be done in any of a variety of ways, including receiving a communication request from the communication device, detecting an emitted signal by the communication device and periodically polling the local network to detect new devices.

When the device is detected, the local network then determines if it is entering or exiting the local network at decision 402. Where the device is entering the local network, wide area network servicing base station information will be received from the device. Where the device is exiting the local network, wide area network servicing base station information will be delivered to the device.

For the case where the device is entering the local network, the network will authenticate the first device at step 403. (For discussion purposes, this delivering device will be referred to as the "first" device, although the delivering device and receiving device may be the same or different. The receiving device will be referred to as the "second" device.) The local network will then associate the first device with the local network at step 404 in accordance with existing protocols.

At step 405, the local network receives the wide area network servicing base station information from the first device. At this step, the controller of the network may wish to catalog and sort the information as well. For example, as noted above, the controller may associate an access point address with the information when received. The local network will additionally store the wide area network servicing base station information in a local memory. The wide area network servicing base station information may optionally be linked to a particular access point as shown at step 406. Additionally the wide area network servicing base station information may be distributed to other access points, as shown at step 407.

When the second wireless communication device, be it the same as the first or different, leaves the local network as determined in decision 402, the network first retrieves the wide area network servicing base station information from the local memory and then provides the information to the second device at step 408. Since the second device is being handed off to the wide area network, the local network disassociates the second device from the local network at step 409, and deactivates the device from the network at step 410 in accordance with existing protocols. Thus, communication ceases between the second device and the local network at end point 411.

Figure 5:
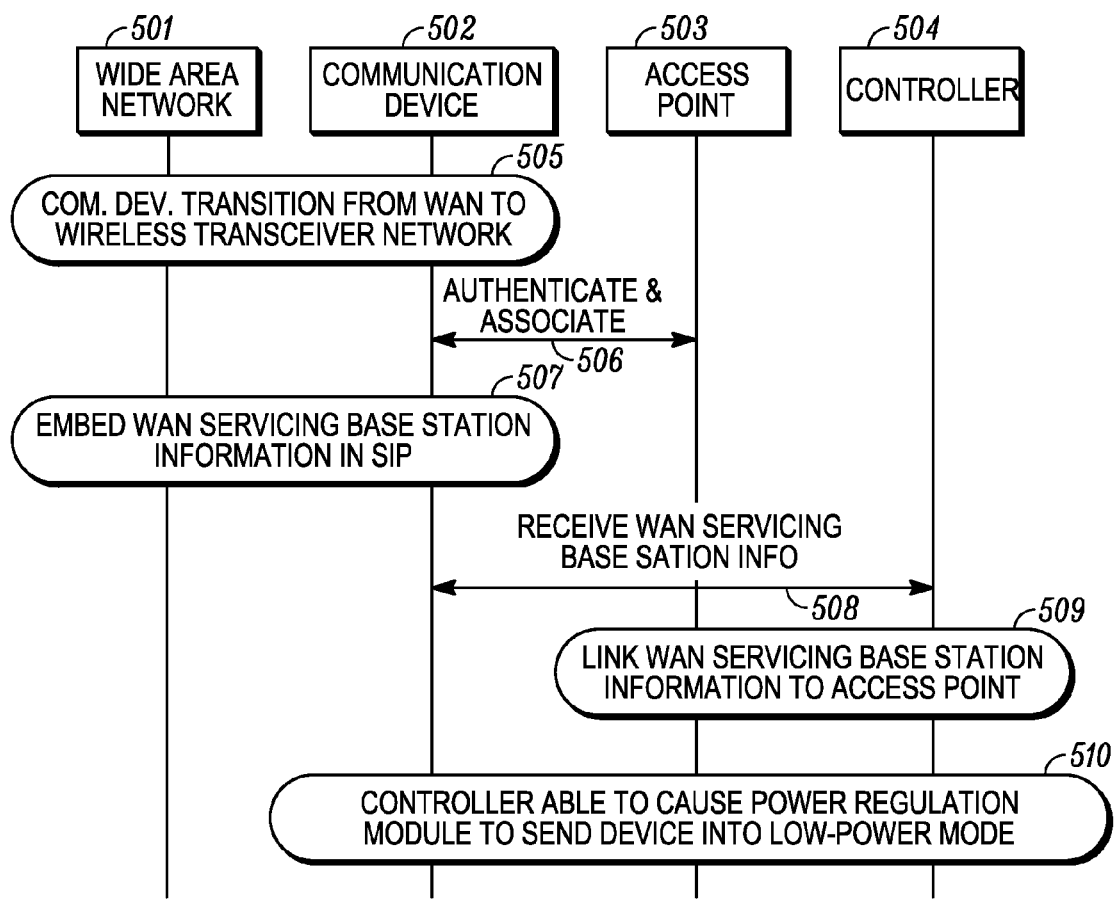
Figure 6:
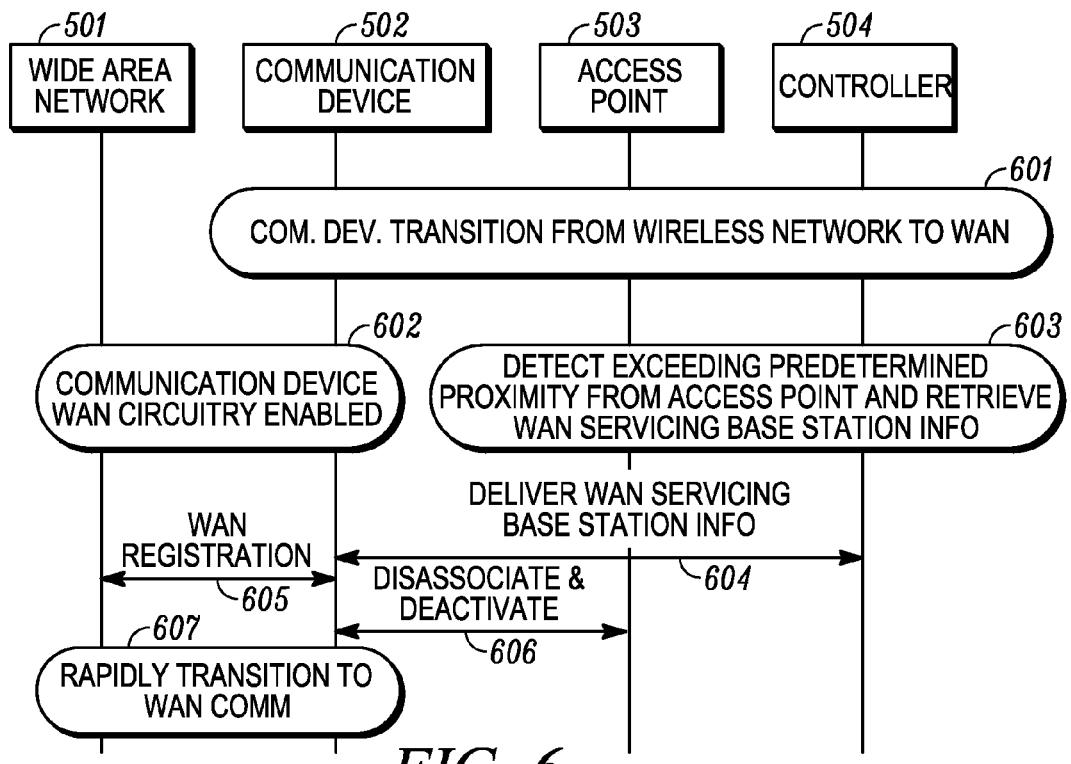

Turning now to FIGS. 5 and 6, illustrated therein is a signal flow representation of the method shown in FIG. 4, illustrating with more specificity the interaction of the various components. FIG. 5 illustrates the "device entering" scenario, while FIG. 6 illustrates the "device exiting" scenario. Both FIG. 5 and FIG. 6 illustrate a wide area network 501, a communication device 502 an access point of a wireless local area network 503, and a controller 504 of the wireless local area network.

Summarizing the discussion from above, one first step is for the communication device 502 to detect the local network. Where the device 502 is configured to operate with the local network, this detection initiates a transition from the wide area network to the local network as shown in block 505. The device 502 then begins to authenticate and associate with an access point 503 in the local network as illustrated at segment 506.

Once authenticated and associated, the device 502 then compiles the wide area servicing base station information as illustrated in block 507. As noted above, one exemplary mechanism for transmitting this data is by way of a SIP message. The device 502 transmits the wide area network servicing base station information to the access point 503 and thus to the controller 504 as is illustrated by segment 508. The controller 504 may then link the wide area network servicing base station information to the specific access point as illustrated in block 509. The device 502, due to the fact that it is communicating only with the local network, is able to enter a reduced power consumption mode as shown in block 510.

For the reverse scenario, i.e. where the device 502 is exiting the system, the steps are shown in FIG. 6. At block 601, the communication device, perhaps by way of the proximity detector, determines that a transition from the local network to the wide area network is warranted. Exiting the reduced power consumption mode (if activated), the wide area network communication information is again activated at block 602.

Further as a result of deciding to transition back to the wide area network, the controller 504, by way of a connected access point 503, retrieves the wide area network servicing base station information at block 603 and delivers it to the device 502 at segment 604. The device 502 is then able to rapidly acquire, associate and register with the wide area network beginning at segment 605 and completing at block 607. The completion, in this embodiment, occurs after disassociation and deactivation from the local network (segment 606).

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A wireless transceiver network capable of accommodating transfers of a communication device with a wide area network, the wireless transceiver network, comprising:
    a. a plurality of access points configured to communicate wirelessly with the communication device; and
    b. a controller coupled to the plurality of access points, the controller comprising:
        i. a detection module configured to detect the communication device entering the wireless transceiver network by detecting when the communication device is within a first predetermined proximity of any of the plurality of access points;
        ii. an association module configured to authenticate and associate the communication device with the wireless transceiver network; and
        iii. a wide area network information module configured to receive wide area network servicing base station information servicing the communication device when the communication device enters the wireless transceiver network from the communication device when the communication device enters the wireless transceiver network; and
        iv. a delivery module configured to, upon the communication device or another communication device exiting the wireless transceiver network, deliver the wide area network base station information received from the communication device when the communication device entered the wireless transceiver network to the wireless communication device or the another communication device.

2. The wireless transceiver network of claim 1, wherein the controller further comprises a linking module configured to associate the wide area network servicing base station information with a specific access point, wherein the specific access point comprises an access point from which the wide area network servicing base station information was received.

3. The wireless transceiver network of claim 1, wherein when any communication transmits a request for the wide area network servicing information, the delivery module delivers the wide area network servicing base station information to the any communication device.

4. The wireless transceiver network of claim 1, wherein the any of the plurality of access points comprises the specific access point.

5. The wireless transceiver network of claim 1, wherein the any of the plurality of access points and the specific access point are different.

6. The wireless transceiver network of claim 1, wherein the controller is configured to distribute the wide area network servicing base station information received from the communication device to any of the plurality of access points.

7. The wireless transceiver network of claim 6, wherein the controller further comprises a delivery module, wherein when any communication device exceeds a predetermined proximity from any of the plurality of access points, the delivery module delivers the wide area network servicing base station information to the any communication device.

8. The wireless transceiver network of claim 7, wherein the control module further comprises a transfer module configured to disassociate and deactivate the any communication device from the wireless transceiver network upon delivery of the wide area network servicing base station information to the any communication device.

9. The wireless transceiver network of claim 1, wherein the wide area network comprises a cellular network, further wherein the wide area network servicing base station information comprises at least one of: service provider identification, base station identification, base station identity code, broadcast control channel, neighbor lists, base station location, channel frequency, absolute radio frequency channel number, channel timeslot information, channel band information, primary and secondary synchronization codes, and channel identification information.

10. The wireless transceiver network of claim 1, wherein the wide area network servicing base station information comprises information used by the communication device to communicate with a base station of the wide area network when the communication device is in communication with both the wide area network and the wireless transceiver network.

11. The wireless transceiver network of claim 1, wherein the communication device comprises a radiotelephone, further wherein the wide area network is selected from the group consisting of GSM networks, CDMA networks, TDMA networks, iDEN networks, WiMAX networks and UMTS networks.

12. The wireless transceiver network of claim 1, wherein the wireless transceiver network comprises a wireless local area network.

13. The wireless transceiver network of claim 1, wherein the wide area network servicing base station information is received by way of a session initiation protocol message.

14. A wireless communication device capable of communicating with a plurality of heterogeneous wireless communication networks, comprising:
 a. a transceiver capable of exchanging switched packet data with at least a first wireless communication network and a second wireless communication network; and
 b. a central processor coupled to the transceiver, the central processor having storage memory associated therewith;
 wherein upon communicating with both the first wireless communication network and the second wireless communication network, the wireless communication device transmits network servicing base station information associated with the first wireless communication network to an access point coupled to the wireless second communication network;
 further wherein upon exiting one of the second wireless communication network, the central processor causes the transceiver to transmit a request for the network servicing base station information associated with the first wireless communication network that was transmitted by the wireless communication device to the access point.

15. The wireless communication device of claim 14, further comprising a power regulation module operative with and responsive to the central processor, wherein when the wireless communication device is communicating only with the second wireless communication network, the central processor causes the power regulation module to actuate a reduced power consumption mode within the wireless communication device.

16. The wireless communication device of claim 14, further comprising an access point proximity detector, wherein when the access point proximity detector determines that the wireless communication device exceeds a predetermined range from an access point in the wireless second communication network, the central processor causes the transceiver to transmit the request to the access point for the network servicing base station information associated with the first wireless communication network.

17. The wireless communication device of claim 16, wherein the access point proximity detector determines that the wireless communication device exceeds the predetermined range from the access point based upon a criterion selected from a quality of signal measurement and a strength of signal measurement.

18. The wireless communication device of claim 14, wherein the wireless communication device comprises a radiotelephone, further wherein the first wireless communications network is selected from the group consisting of GSM networks, CDMA networks, TDMA networks, iDEN networks, WiMAX networks and UMTS networks.

19. The wireless communication device of claim 14, wherein the second wireless communications network comprises a wireless local area network.

20. A method of transferring a wireless communication device between a local wireless base transceiver network to a wide area network, the method comprising the steps of:
 upon a first wireless communication device entering the local wireless base transceiver network:
  authenticating the first wireless communication device;
  associating the first wireless communication device; and
  receiving wide area network servicing base station information from the first wireless communication device;
 storing the wide area network servicing base station information in a local memory of the local wireless base transceiver network; and
 upon a second wireless communication device leaving the local wireless base transceiver network:
  retrieving the wide area network servicing base station information from the local memory of the local wireless base transceiver network;
  providing the wide area network servicing base station information to the second wireless communication device; and
  disassociating the second wireless communication device from the local wireless base transceiver network.

21. The method of claim 20, wherein the first wireless communication device and the second wireless communication comprise different communication devices.

22. The method of claim 20, wherein the first wireless communication device and the second wireless communication device comprise one communication device.

* * * * *